(12) United States Patent
Schnell (10) Patent No.: US 6,291,991 B1
(45) Date of Patent: Sep. 18, 2001

(54) DEVICE FOR CONTINUOUSLY MONITORING THE JUNCTION OF A CONVEYOR BELT

(75) Inventor: Wolfgang Schnell, Hamburg (DE)

(73) Assignee: Phoenix Aktiengesellschaft, Hamburg (DE)

( * ) Notice: Subject to any disclaimer, the term of this patent is extended or adjusted under 35 U.S.C. 154(b) by 0 days.

(21) Appl. No.: 09/485,568

(22) Filed: Feb. 11, 2000

(30) Foreign Application Priority Data

Feb. 13, 1998 (DE) .................................... 198 05 754

(51) Int. Cl.[7] ............................ G01N 27/82; G01R 33/12
(52) U.S. Cl. ...................... 324/235; 324/242; 324/238; 198/810.02
(58) Field of Search .................................. 324/234, 235, 324/238, 239, 240–243, 226, 206, 244.1; 198/810.02, 810.04; 338/32 R, 32 H; 340/675, 676; 356/239

(56) References Cited

U.S. PATENT DOCUMENTS

| 4,020,945 | 5/1977 | Takeno et al. | 198/810.02 |
| 4,409,852 | * 10/1983 | Suzuki et al. | 324/206 |
| 5,291,131 | 3/1994 | Kenshi et al. | 324/206 |
| 5,426,362 | * 6/1995 | Ninnis | 324/235 |
| 5,847,563 | * 12/1998 | Blum | 324/232 |

FOREIGN PATENT DOCUMENTS

| 31 31 963 | 2/1983 | (DE) . |
| 195 25 326 | 10/1996 | (DE) . |
| 09 175628 | 7/1997 | (JP) . |

* cited by examiner

*Primary Examiner*—Jay Patidar
(74) *Attorney, Agent, or Firm*—Collar & Roe, P.C.

(57) ABSTRACT

The present invention relates to a device for continuously monitoring the junction of a conveyor belt which is made of rubber or a rubber-type plastic material and which comprises supports inserted therein for reinforcing the same. In an advantageous embodiment, the device essentially comprises the following constituent members for the junction area: mainly four reference marks, two addresses as well as four detection heads, the heads being located above the carrier surface of the conveyor belt. This invention further relates to other advantageous embodiments of this device.

31 Claims, 4 Drawing Sheets

DEVICE FOR CONTINUOUSLY MONITORING THE JUNCTION OF A CONVEYOR BELT

BACKGROUND OF THE INVENTION

1. Field of the Invention

The invention relates to a device for continuously monitoring the junction of a conveyor belt made of rubber or a rubber-type material which in particular is provided with embedded strength supports for reinforcing said material.

German laid-open patent specification DE-A-31 31 963 describes a system for monitoring conveyor installations and conveyor belt rollers, specifically in connection with a detection system for detecting mechanical values such as the number of revolutions, the torque, the load acting on the bearings, the temperature, the slack and the tension of the belt, damage to the belt, and oblique run of the belt. Furthermore, patent specification DE-C-195 25 326 introduces a method and an arrangement for monitoring a conveyor belt with the use of transponders. Finally, U.S. Pat. No. 4,020,945 describes a device for continuously monitoring the junction of a conveyor belt. With said device, magnetic areas serving as reference marks are incorporated in the conveyor belt material at the head and at the end of the junction area. The passage of said reference marks is detected by a reference mark detection system, and both the speed of the conveyor belt and the length of the junction area are measured based on the values so detected.

2. The Prior Art

The junctions of conveyor belts are generally viewed as zones of a conveyor belt installation to which special attention needs to be paid with respect to the functionality and durability of such junctions, the reason for this being that the tensile forces change in said zones from the strength support into the rubber material of the junction, and again into the strength support of the following length of the belt. In this process, the force of traction will stress both the rubber with forces of shear and strain the adhesion between the rubber and the strength support. Furthermore, it has to be assumed that the distribution of stress within the junction area and in the areas of transition will not be homogeneous, so that there will be always zones from where failure of the junction can originate after the conveyor belt has been in use for long periods of time.

Such events have to be avoided because failure of a conveyor belt junction poses a very high danger potential and a substantial economical risk. Therefore, operators of conveyor belt installations increasingly request monitoring systems for conveyor belt junctions that alert the operator to any onset of failure in due time, and permit the implementation of repair measures before failure of the junction occurs.

In addition to regular inspections, by which external damage can be detected visually, a possibility available is to continuously and automatically monitor the entire length of the junction or individual discrete zone of the junction. With multistage steel rope-reinforced belt junctions, such zones may be, for example the deflection zones and the so-called guide marks. The starting point in this connection is the idea that under normal operating conditions (but not under extreme overloading conditions), a junction will not fail all of a sudden as a whole, but failure will start gradually from individual zones of the junction. The remaining intact zones are in such a situation subjected to higher stresses, which leads to higher elongation and consequently to an increase in the length of the loaded junction.

The lengths of the junction or reference distances covered and detected in defined sites of the belt installation have to be compared with rated and limit values which, if exceeded, will result in a warning message or even shutdown of the installation.

Adverse influences such as, for example varying load conditions, different measuring sites and temperature changes must, of course, be eliminated by corrective methods of calculation. The length must be detected automatically and continuously with high precision and reliability, which means that the systems to be employed for obtaining the measured values and for the detection have to satisfy extremely strict requirements. This is made even more difficult by the environmental conditions prevailing on site, which may be the environmental conditions of a rough mining operation. It is necessary in this connection to satisfy the conditions of underground pit coal mining just as well as the conditions found in open-pit brown or soft coal mining, or the conditions of ore mining both above-ground and underground. Special requirements have to be met when conveyor belt installations are employed in regions with extreme climatic conditions, for example in desert and tropical zones, in mountain areas, and under arctic conditions.

Since the measurements have to be taken continuously on the operating conveyor belt plant, it is necessary also to take into account the fact that the measuring site not only migrates in the longitudinal direction of the belt at belt speeds reaching up to 8 m/s, but that also displacements of the surface of the conveyor belt of up to ±100 mm take place sideways, and vertical shifts of about ±10 mm may occur in the form of vibrations.

The lengths of the junctions of the conveyor belts comes to between ≦1 m and 8 m depending on which type of belt is employed, as well as on the strength of the belt. The resolution of the measured values and the measuring accuracy should be in the order of magnitude of 1 mm or better.

SUMMARY OF THE INVENTION

The present invention contains at least two, in particular four reference marks, which are arranged in such a way that at least one reference mark, in particular two reference marks are located both in the zone of the head of the junction area and the end of the junction area, said reference marks being permanently worked into the marginal zone of the top (carrier) side of the conveyor belt, or within the lateral edge zone extending between the bottom and the top sides, whereby the reference marks are stable versus higher thermal and pressure loads as well as versus moisture and other mechanical and chemical stresses.

A reference mark detection system adapted to the type of reference mark used, for the purpose of measuring the speed and also the length of the junction, whereby the reference mark detection system is arranged on the left and/or the right viewed in the direction of movement of the conveyor belt.

A signal processing system for the reference mark detection system based on time measurement, whereby the signals supplied by the reference mark detectors are processed and adapted in such a way that the beginning and the end of the time measurement process can be triggered in a reliable and precise manner.

An identification system that is not depending on the direction of movement of the conveyor belt and comprises the following:

An address for the purpose of identifying the measuring site, said address being located outside of the zone of the junction near the head and/or the end of the junction, whereby the address is arranged on the left and/or the right of the belt viewed in the direction of movement of the conveyor belt, more specifically within the edge area of the bottom and the top sides of the conveyor belt, or within the lateral edge zone extending between the bottom and the top (carrier) sides;

An address detector adapted to the type of address used, said detector being arranged on the left and/or the right viewed in the direction of movement of the conveyor belt as well; and A reading device for the address, said reading device in turn being connected to the address detector;

a time-measuring member connected with the signal processing system for the reference mark detection system;

a measuring system for determining the temperature of the conveyor belt and the ambient temperature;

another measuring system for determining the tractive force of the belt; as well as a process computer for evaluating all data, whereby the process computer in turn is connected with a drive control.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
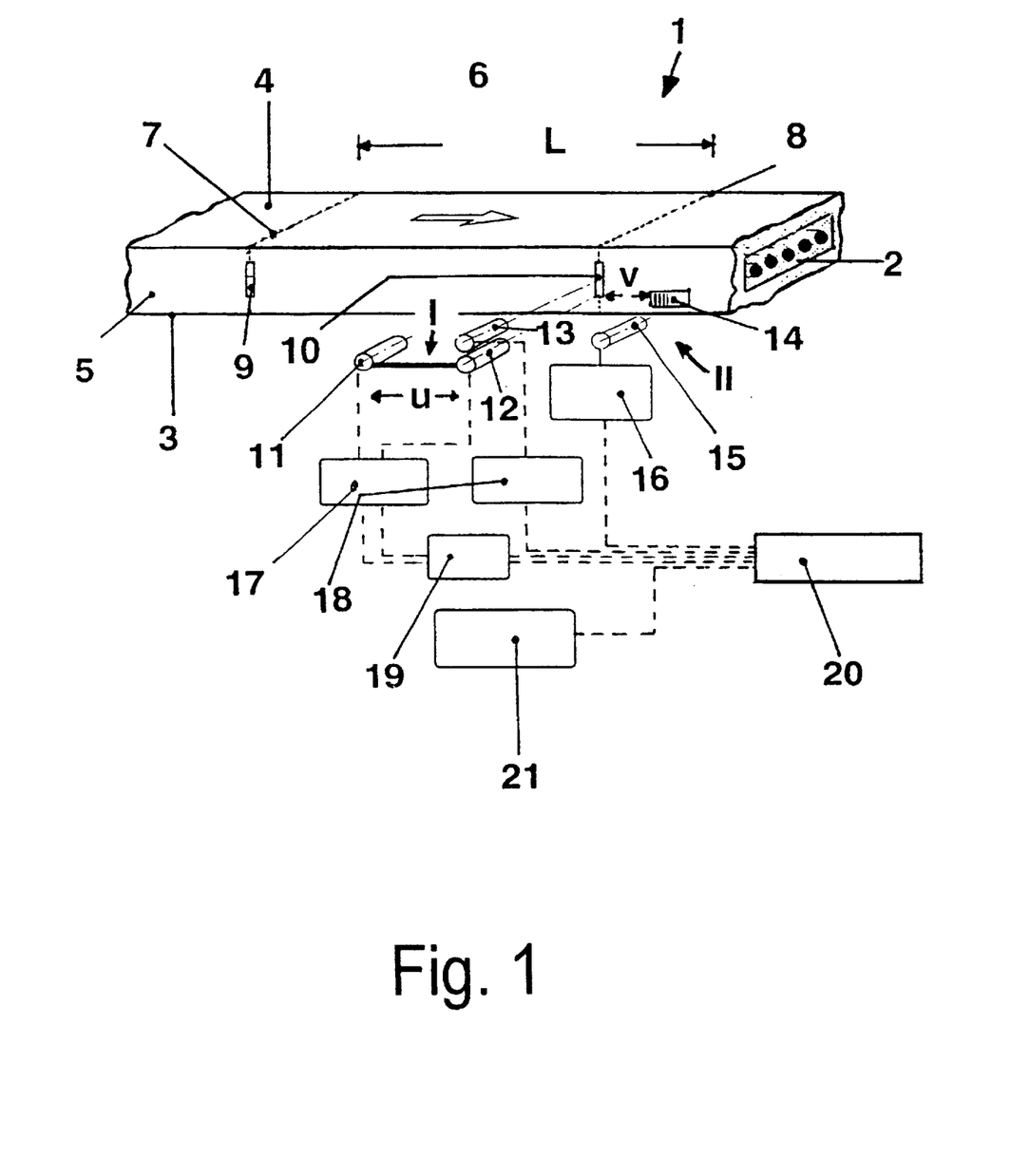
FIG. 1 shows a device with a reference mark detection system, in which the detectors are arranged at the level of the lateral edge zone extending between the bottom and the top sides of the conveyor belt, as well as with an identification system, in which the address is a code, for example a bar code.

Referring now in detail to the drawings and, in particular, FIG. 1 shows a conveyor belt 1 made of rubber or a rubber-like plastic material with the embedded supports 2 in the form of steel ropes, in particular in combination with an additional synthetic cord-type cross reinforcement for the purpose of protecting the conveyor belt against slitting and impacting. The junction zone 6 with length "L" as defined by the invention is delimited in the direction of movement (arrow direction) of the conveyor belt by a junction head 7 and a junction end 8.

At least one reference mark 9 and 10, respectively, is located directly both within the junction head 7 and the junction end 8, respectively, said reference mark being worked into the lateral edge zone 5 extending between the bottom side 3 and the top side 4 of the conveyor belt. The reference marks have to be resistant to higher thermal and pressure stresses, as well as to moisture and chemicals and other mechanical stresses. The reference marks, furthermore, preferably consist of a material with electric and/or magnetic properties in the form of smaller metallic strips or permanent magnets. As an alternative, the reference marks also may be optical markings, or mechanically produced notches or elevations (projections).

A reference mark detection system I is associated with the reference marks 9 and 10 for the purpose of measuring the speed and also the length of the junction. Said measuring system comprises two detectors 11 and 12, which are arranged with a spacing "u" from each other viewed in the direction of travel of the conveyor belt. Said spacing is the measuring distance for measuring the speed. The spacing "u" is either smaller than the length "L" of the junction or preferably about corresponds with the length of the junction. Another detector 13 measures the length of the junction. Said detector 13 can be omitted, if need be, in which case the length of the junction is measured by at least one of the two detectors 11 and 12.

Preferably, sensors based on radar/microwaves, inductive methods, optical or optoelectric methods including laser sensor systems, magnetosensitive systems, in particular Hall sensors or magnetoresistive sensors, as well as ionizing radiation are employed in connection with the reference mark detection system I.

An identification system II, which is independent of the direction of travel of the conveyor belt, comprises an address 14 for the purpose of identifying the measuring site, said address being located outside of the junction area 6 near the junction end 8. The spacing of the address 14 from the junction end 8 is in this connection smaller than the junction length "L", in particular smaller than ¼ of the length of the junction. In the present case, the address is a code in particular under the aspect of mechanical, magnetic, electrically conductive or radioactive detection. Preferred is in this connection a bar code or a code structured similar to a bar code.

Other components of the identification system II are an address detector 15 as well as a reading device 16 for the address 14, said reading device in turn being connected to the address detector.

The entire system is supplemented by a signal processing system 17 and 18 based on time measurement, said processing system being connected with the reference mark detection system I, on the one hand, and with a time measuring member 19 on the other. It is important in this connection that the signals supplied by the reference marks detectors are processed and adapted in such a way that the beginning and the end of the time measurement can be triggered in a reliable and precise manner.

The reference marks 9 and 10 and the reference mark detection system I and the identification system II are advantageously arranged on the left and on the right viewed in the direction of travel of the conveyor belt.

Figure 2:
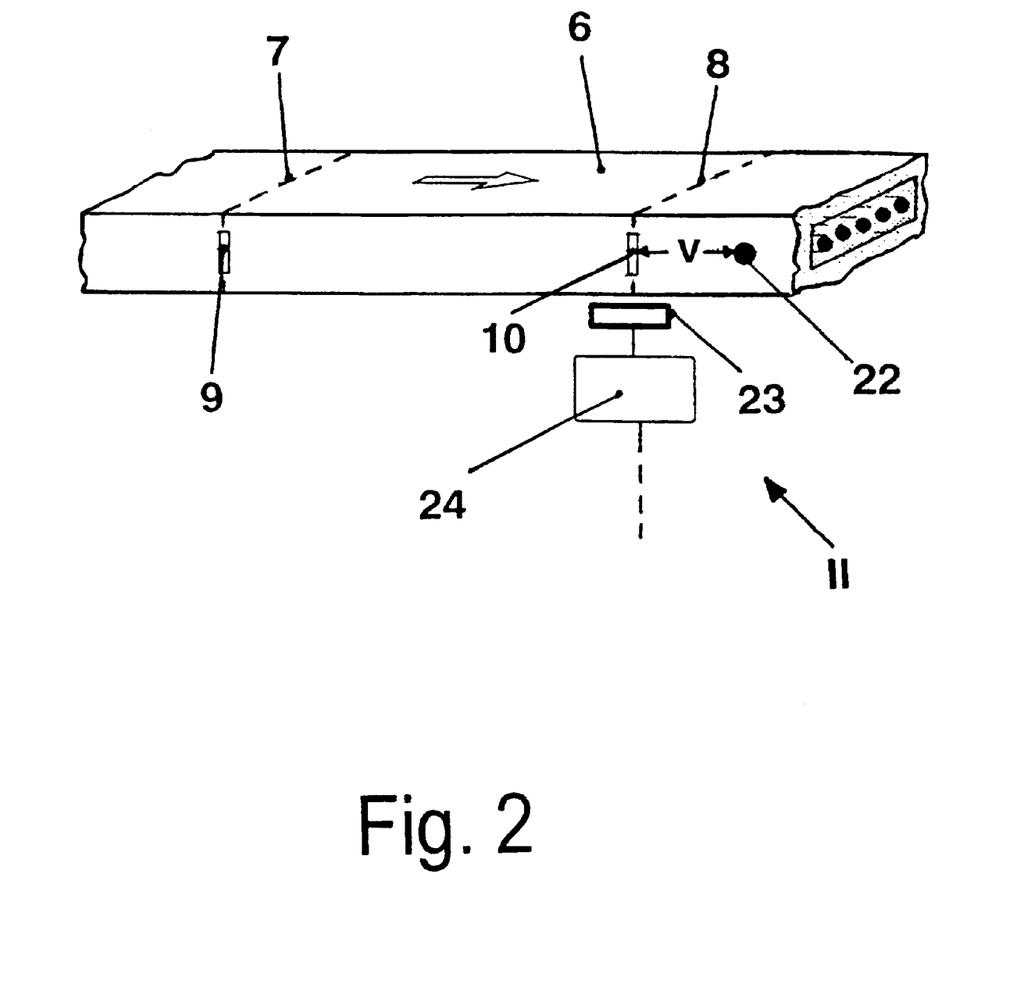
FIG. 2 shows a device with a reference mark detection system comprising the same arrangement principle as the one shown in FIG. 1; however, with an identification system in which the address is a transponder.

With respect to the exemplified embodiment according to FIG. 2, reference is made to FIG. 1 in regard to the reference marks 9 and 10 and the associated reference mark detection system.

Within the framework of said exemplified embodiment, the identification system II is structured in an entirely different way, said system II comprising an address 22 in the form of a transponder. The corresponding address detector is an antenna 23 with an associated transmitting and receiving and reading device. A reading device 24 for the transponder is connected to the antenna in the present case as well. In the present embodiment, too, said identification system is advantageously arranged on the left and right viewed in the direction of travel of the conveyor belt.

Reference is made to FIG. 1 with respect to other components of the device.

Figure 3:
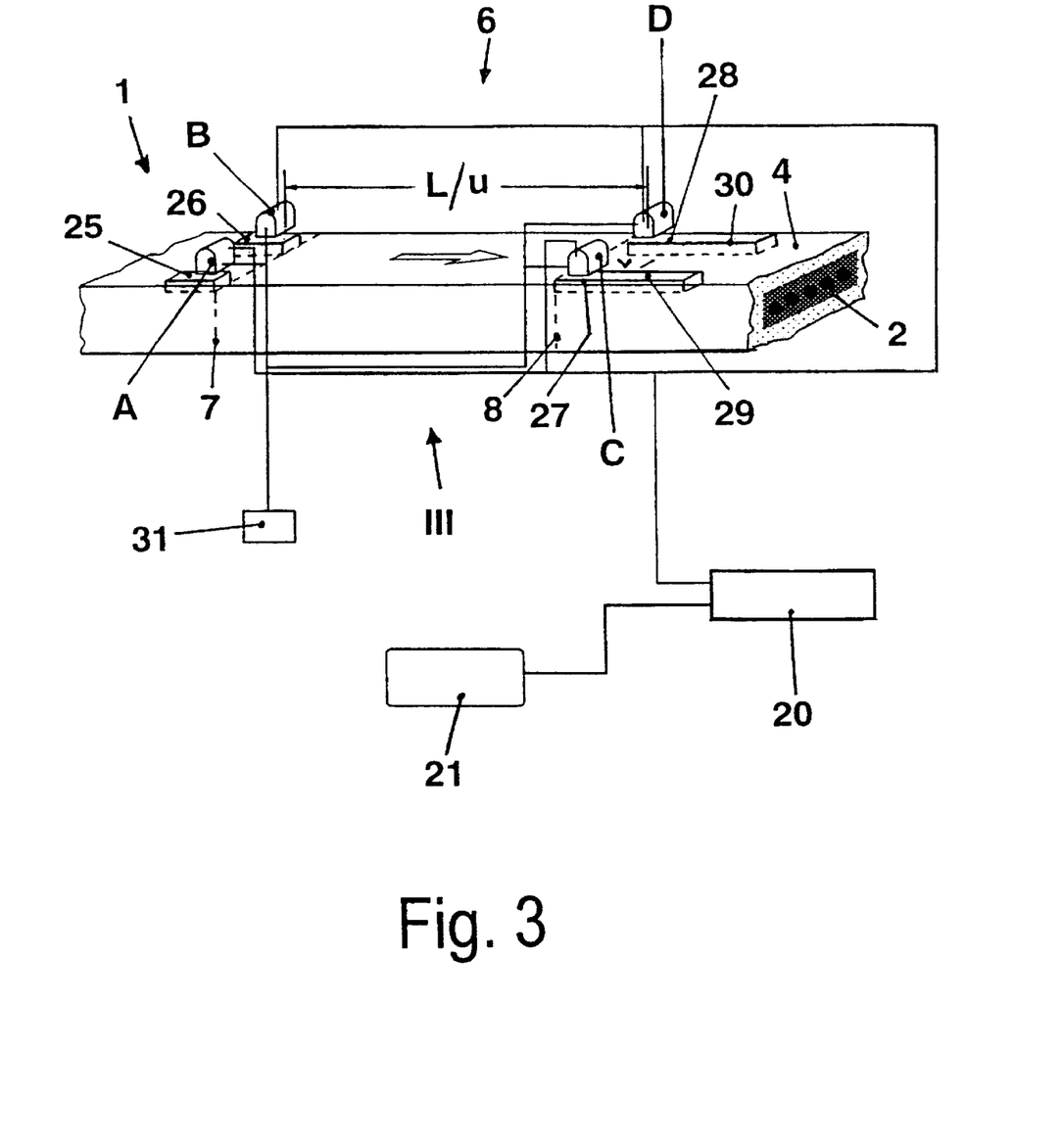
FIG. 3 shows a device with a reference mark detection system comprising four sensor heads arranged above the carrying side within the edge zone of the conveyor belt, whereby the reference mark detection system and the identification system jointly form an integrated overall system.

Now, FIG. 3 shows a particularly useful variation of the device for monitoring the junction of the conveyor belt 1, which again comprises the embedded strength supports 2 consisting of steel.

A total of four reference marks 25, 26, 27 and 28 are arranged outside of the junction area 6, more specifically bordering on the junction head 7 and the junction end 8. In this connection, each reference mark is worked into the edge zone 4 of the top (carrier) side 4 of the conveyor belt. Furthermore, two addresses 28 and 29 are present with a spacing "v" from the junction end 8, said addresses being worked into the edge zone of the top (carrier) side 4 of the conveyor belt as well. The reference marks 27 and 28 within the area of the junction end 8 and the addresses 29 and 30, respectively, jointly form in this connection a single-piece composite. The reference marks and the addresses consist of permanent magnets specifically in the form of a tandem arrangement. The reference marks and the addresses are advantageously embedded in rubber or a material similar to rubber.

In the present embodiment, the overall reference mark detection and identification system III contains the four sensor heads A, B, C and D, which are located above the top (carrier) side 4 of the conveyor belt. Viewed in the direction of travel of the conveyor belt, the spacing "u" between the two sensor heads A and C, and B and D, respectively, approximately corresponds with the length "L" of the junction. Said four sensor heads are preferably accommodated in a metal housing made of, for example aluminum. Said overall system III, which is connected to an energy supply 31, simultaneously measures the speed and the length of the junction and identifies the measuring site.

The reference mark detection system integrated in said overall system III, like in the embodiment according to FIG. 1 or FIG. 2, requires a signal processing system based on time measurement, as well as a time-measuring member. All data are evaluated also here with the help of a process computer 20.

Figure 4:
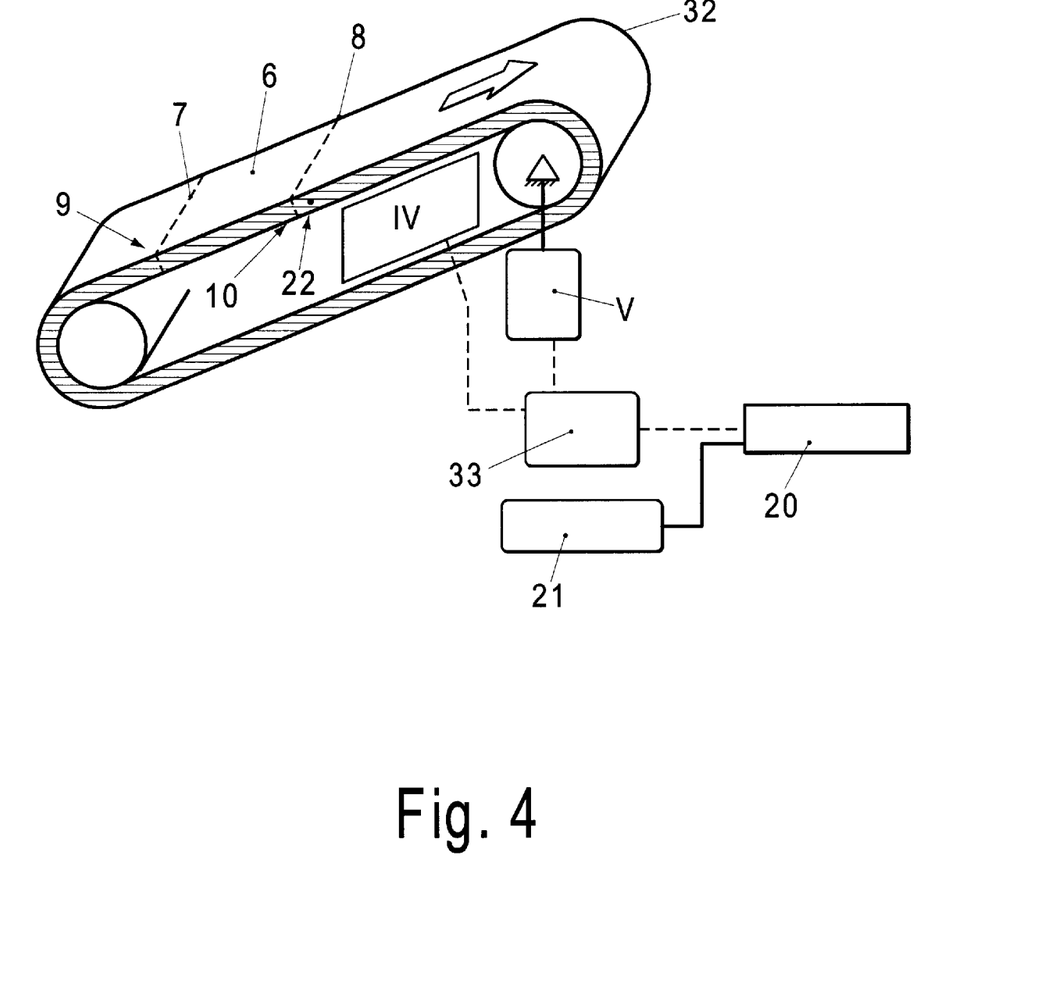
FIG. 4 shows a device for determining the belt temperature and the ambient temperature as well as the tensile force of the belt.

Now, FIG. 4 shows a simplified representation of a conveyor installation, whereby reference is made to FIG. 2 with respect to the description of the reference marks 9 and 10, which are directly located within the head 7 and the end 8 of the junction area 6, as well as also in regard to the address 22 in the form of a transponder.

The device for monitoring the junction is equipped with a measuring system IV for determining the temperature of the belt and the ambient temperature using an infrared measuring technique.

The following has to be noted concerning the temperature of the belt:

Since the temperature has to be continuously measured on the running belt, this problem is solved particularly with the infrared measuring technique. The measuring system to be employed has to be dimensioned in this connection in such a way that it conforms to the environmental conditions prevailing at the site where it is employed. Especially the risk of soiling of the equipment has to be avoided through suitable constructional measures, for example by blowing the optics free with filtered air. The measuring range should reach from −40° C. to +100° C. depending on the given local conditions. The measuring system must safely function at ambient temperatures in the range of from −20° C. up to +60° C. If applicable, it is necessary also in this case to take into account the special conditions of underground pit coal mining.

The following needs to be mentioned concerning the measurement of the ambient temperature:

This measuring task is preferably solved with a measuring system based on a measuring element, for example a thermoelement or resistance thermometer. The measuring system has to function in this connection safely and with adequate accuracy under the given environmental conditions, specifically in a measuring range of from −40° C. to +60° C. If applicable, the conditions of underground pit coal mining have to be taken into account in this regard as well.

Another system, specifically the measuring system V for determining the tensile force of the belt, has to be conceived taking into account the conditions under which the conveyor system is operated, and it has to be integrated in said conveyor system accordingly. It is possible to consider in particular measuring systems based on measuring bearings, hydraulic systems (pressure measuring cells), or torque measuring hubs, which are preferably arranged in the drive drum 32 or in the reversing drum with the highest tractive force. Furthermore, it is possible also to employ for this purpose the power consumption of the drive provided such consumption can be measured with the required accuracy. The measuring accuracy should amount to ±3% or better.

It is advantageous, furthermore, if the result of the measurement within the framework of the determination of the temperature of the belt and the ambient temperature, and also of the tractive force of the belt, is directly supplied to the process computer 20 in the form of a digital signal (signal processing 33).

Furthermore, it is useful if the measuring systems IV and V are arranged on the left and right viewed in the direction of travel of the conveyor belt.

What is claimed is:

1. A device for continuously monitoring the junction of a conveyor belt (1) consisting of rubber or a rubber-like plastic, said conveyor belt being provided with embedded strength supports (2), whereby the junction area (6) comprises a head (7) and an end (8) and the device for determining deviations from rated values comprises:

At least two reference marks (9, 10, 25, 26, 27, 28) arranged in such a way that at least one reference mark are located in each of the junction head (7) and the junction end (8) and disposed in an edge zone of a bottom side (3) or the top side (4) of the conveyor belt, or within a lateral edge zone (5) extending between the bottom and the top sides, whereby the reference marks are resistant to higher temperature and pressure loads as well as to moisture and other mechanical and chemical stresses;

A reference mark detection system (I, III) adapted to the type of reference mark employed for measuring the speed and also the length of the junction, whereby the reference mark detection system is arranged on the left or on the right viewed in the direction of travel of the conveyor belt;

A signal processing system (17, 18) for the reference mark detection system based on time measurement, whereby the signals supplied by the reference mark detectors (11, 12, 13; A, B, C, D) are processed and adapted in such a way that the beginning and the end of the time measurement can be reliably and precisely triggered;

An identification system (II, III) independent of the direction of travel of the conveyor belt, said identification system comprising the following:

an address (14, 22, 29, 30) for identifying the measuring site, said address being located outside of the junction area (6) near the head of the junction (7) and the end (8) of the junction, whereby the address is arranged on the left or the right viewed in the direction of travel of the conveyor belt, specifically within the edge area of the bottom side (3) or the top side (4) of the conveyor belt, or within the lateral edge zone (5) extending between the bottom and the top sides;

an address detector (15, 23; C, D) adapted to the type of address employed, said address detector also being arranged on the left or the right viewed in the direction of travel of the conveyor belt; as well as a reading device (16, 24) for the address, said reading device in turn being connected to the address detector;

a time measuring member (19) connected with the signal processing system for the reference mark detection system;

a measuring system (IV) for determining the temperature of the belt and the ambient temperature;

another measuring system (V) for determining the tractive force of the belt, and a process computer (20) for the purpose of evaluating all data, whereby the process computer (21) is in turn connected to a drive control.

2. The device according to claim 1, wherein the reference marks (9, 10) are directly located within the junction head (7) and, respectively, junction end (8).

3. The device according to claim 1, wherein the reference marks (25, 26, 27, 28) are located outside of the junction area (6), and specifically bordering on the junction head (7) and, respectively, the junction end (8).

4. The device according to claim 1, wherein the reference marks (9, 10, 25, 26, 27, 28) consist of a material with electrical and magnetic properties, in particular in the form of smaller metallic strips or permanent magnets, whereby the permanent magnets are preferably present in the form of a tandem arrangement.

5. The device according to claim 1, wherein the reference marks are optical markings or mechanically produced notches or elevations.

6. The device according to claim 1, wherein the address (14, 22, 29, 30) has a spacing from the junction head (7) or, respectively, from the junction end (8) which is smaller than the junction length (L), in particular smaller than ¼ of the length of the junction.

7. The device according to claim 1, wherein the address (14, 29, 30) of the identification system is a code in particular under the aspect of mechanical, optical, magnetic, electrically conductive or radioactive detection.

8. The device according to claim 7, wherein the code (14) is a bar code.

9. The device according to claim 7, wherein the code (29, 30) consists of small permanent magnets specifically in the form of a tandem arrangement.

10. The device according to claim 1, wherein the address (22) of the identification system is a transponder, whereby the address detector is an antenna (23) with an associated transmitting and receiving and reading device.

11. The device according to claim 1, wherein the address (14, 24) of the identification system (II) is a separate component with respect to the reference marks.

12. The device according to claim 1, wherein the address (29, 30) of the identification system (III) and the reference marks (25, 26, 27, 28) form one single component.

13. The device according to claim 1, wherein the reference marks (9, 10, 25, 26, 27, 28) and the address (14, 22, 29, 30) are embedded in rubber.

14. The device according to claim 1, wherein the reference marks (9, 10) and also the address (14, 22) are worked into the edge zone (5) extending between the bottom side (3) and the top side (4) of the conveyor belt.

15. The device according to claim 1, wherein the reference marks (25, 26, 27, 28) and the address (29, 30) are disposed in the edge zone of the top side (4) of the conveyor belt.

16. The device according to claim 1, wherein the reference mark detection system (I, III) comprises sensing devices.

17. The device according to claim 1, wherein the reference mark detection system (I, III) consists of at least two detectors arranged spaced from each other with a spacing (u) viewed in the direction of travel of the conveyor belt, said spacing being the measuring distance over which the speed is measured.

18. The device according to claim 17, wherein the detectors (11, 12, 13) are arranged at the level of the lateral edge zone (5) extending between the bottom side (3) and the top side (4) of the conveyor belt.

19. The device according to claim 18, wherein the spacing (u) between two detectors (11, 12) arranged in the direction of travel of the conveyor belt is smaller than the junction length (L), but in particular, however, corresponds approximately with the length of the junction.

20. The device according to claim 18, wherein at least one of the two detectors (11, 12), said detectors being arranged with a spacing (u) from each other, measures at the same time the length of the junction.

21. The device according to claim 18, wherein the length of the junction is measured by using an additional detector (13).

22. The device according to claim 17, wherein the reference mark detection system (III) consists of at least two, and sensor heads (A, B, C, D), said detector heads being located above the top side (4) of the conveyor belt and accommodated in a metal housing, whereby the length of the junction is simultaneously measured by means of the detector heads.

23. The device according to claim 22, wherein the spacing (u) between the sensor heads (A, C) arranged in the direction of travel of the conveyor belt approximately corresponds with the length (L) of the junction.

24. The device according to claim 1, wherein the reference mark detection (I) and the identification system (II) operate separately from each other.

25. The device according to claim 1, wherein the reference mark detection system and the identification system form an integrated overall system (III).

26. The device according to claim 1, wherein the measuring system (IV) for determining the temperature of the belt is based on the infrared measuring technique.

27. The device according to claim 1, wherein the measuring system (IV) for determining the ambient temperature comprises a temperature measuring element.

28. The device according to claim 1, wherein the measuring system (V) for determining the tractive force of the belt is based on a measuring bearing, a hydraulic system or a torque-measuring hub.

29. The device according to claim 1, wherein the measuring system for determining the tractive force of the belt is arranged in a driving drum (32) or in a reversing drum.

30. The device according to claim 26, wherein the respective measuring system (IV, V) is arranged on the left or the right viewed in the direction of travel of the conveyor belt.

31. The device according to claim 1, wherein the result measured from the determination of the temperature of the belt and of the ambient temperature, and also the result of the measurement of the tractive force of the belt are directly supplied to the process computer (20) in the form of a digital signal processed in the signal processing system (33).

* * * * *

UNITED STATES PATENT AND TRADEMARK OFFICE
CERTIFICATE OF CORRECTION

PATENT NO. : 6,291,991 B1　　　　　　　　　　　　　　　Page 1 of 1
DATED　　　 : September 18, 2001
INVENTOR(S) : Wolfgang Schnell It is certified that error appears in the above-identified patent and that said Letters Patent is hereby corrected as shown below:

<u>Title page,</u>
Please insert the PCT data as follows:
-- PCT Filed:　　　　January 25, 1999
　PCT No.　　　　　 PCT/DE99/00169
　§ 371 Date:　　　　February 11, 2000
　§ 102(e) Date:　　　February 11, 2000
　PCT Pub. No.:　　　WO 99/41567
　PCT Pub. Date:　　　August 19, 1999 --

Signed and Sealed this

Twenty-eighth Day of May, 2002

*Attest:*

JAMES E. ROGAN
*Director of the United States Patent and Trademark Office*

*Attesting Officer*